(12) United States Patent
Gonsor et al.

(10) Patent No.: US 10,771,658 B2
(45) Date of Patent: Sep. 8, 2020

(54) APPARATUS AND METHOD TO DETERMINE A COLOR WITHIN A RANGE OF COLORS PRODUCIBLE BY AN OUTPUT DEVICE

(71) Applicant: THE BOEING COMPANY, Chicago, IL (US)

(72) Inventors: Daniel Edward Gonsor, Summerville, SC (US); Terrell Riley, Summerville, SC (US); Caitlin Auffinger, Ladson, SC (US); Edward Greene, Charleston, SC (US); Raj Desai, Mount Pleasant, SC (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 16/193,996

(22) Filed: Nov. 16, 2018

(65) Prior Publication Data

US 2020/0162639 A1    May 21, 2020

(51) Int. Cl.
*H04N 1/60*    (2006.01)
*G06F 3/12*    (2006.01)

(52) U.S. Cl.
CPC ......... *H04N 1/6066* (2013.01); *G06F 3/1208* (2013.01); *G06F 3/1255* (2013.01)

(58) Field of Classification Search
None
See application file for complete search history.

(56) References Cited

U.S. PATENT DOCUMENTS

| 6,819,458 | B1 | 11/2004 | Tanaka et al. | |
| 8,705,119 | B2* | 4/2014 | Bonikowski | B41J 2/0057 358/1.1 |
| 9,247,107 | B2 | 1/2016 | Imaseki | |
| 2006/0114483 | A1* | 6/2006 | Nishimura | H04N 1/6058 358/1.9 |
| 2007/0003136 | A1* | 1/2007 | Shimbaru | H04N 1/6058 382/167 |
| 2015/0304523 | A1* | 10/2015 | Imaseki | H04N 1/603 358/1.9 |

OTHER PUBLICATIONS

"Color difference," Wikipedia <https://en.wikipedia.org/wiki/Color_difference> retrieved Nov. 9, 2018, 7 pgs.
Zwicker, M. et al., "Meshing Point Clouds Using Spherical Parameterization," Eurographics Symposium on Point-Based Graphics, 2004, 8 pgs.

* cited by examiner

*Primary Examiner* — Thomas D Lee
(74) *Attorney, Agent, or Firm* — Moore IP Law

(57) ABSTRACT

A method includes receiving information specifying a color gamut. The color gamut corresponds to a range of colors producible by an output device. The method further includes receiving a first indication of a first color associated with a first point in a geometrical representation of the color gamut in a three-dimensional (3D) color space. The method further includes generating, based on the first color, a second indication of a second color that is included in the color gamut. The second color is associated with a second point in the 3D color space. The second point is identified based on a particular value of data associated with a plurality of distances between the first point and a subset of points of the geometrical representation. The subset of points includes more than one and fewer than all points of the geometrical representation.

21 Claims, 5 Drawing Sheets

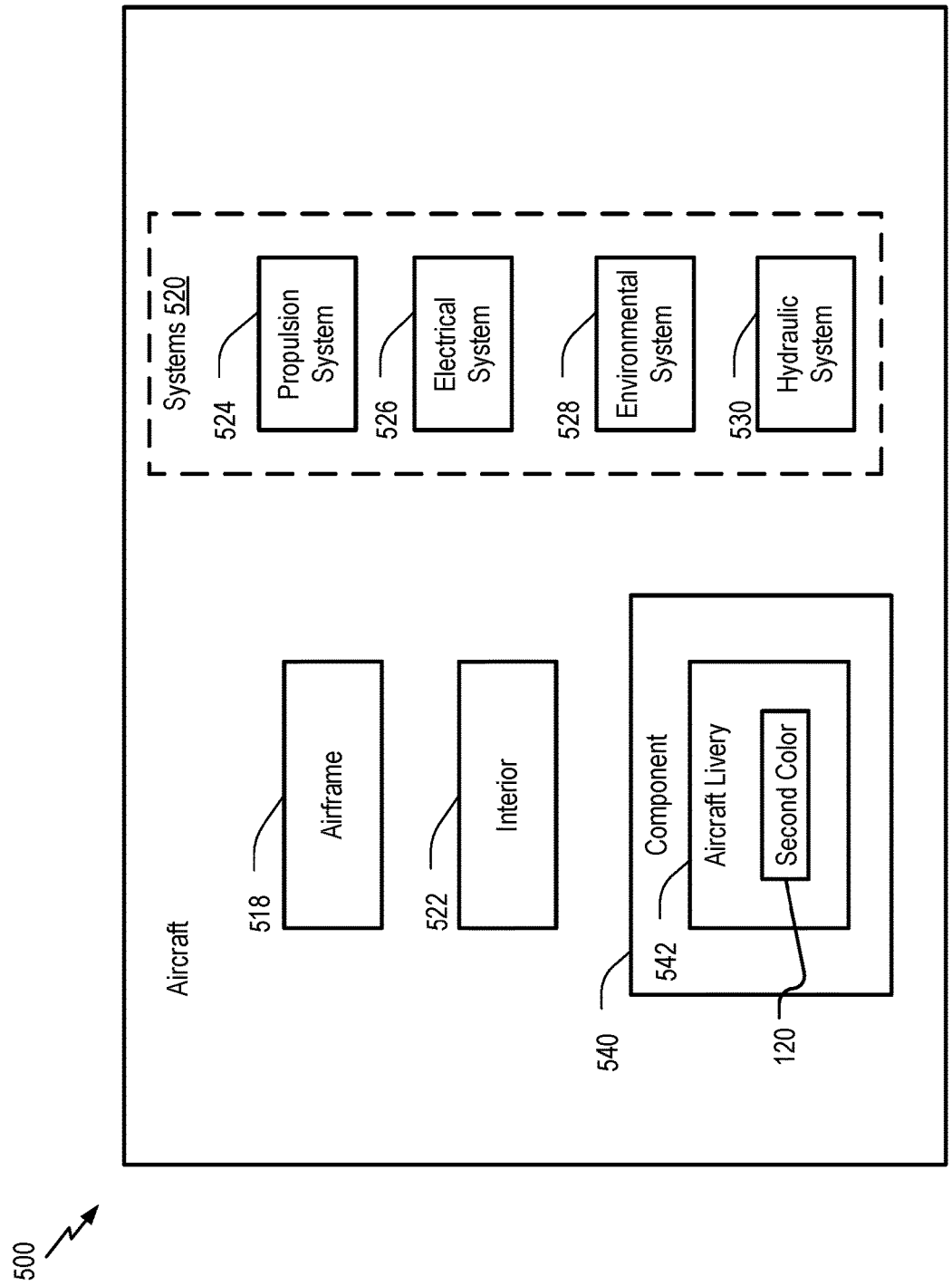

APPARATUS AND METHOD TO DETERMINE A COLOR WITHIN A RANGE OF COLORS PRODUCIBLE BY AN OUTPUT DEVICE

FIELD OF THE DISCLOSURE

The present disclosure is generally related to determination of a color that is within a range of colors producible by an output device.

BACKGROUND

Computing devices encode color information using a color model. The range of colors that can be represented in a color model depends on the amount of data (e.g., number of bits) used to represent the color. Thus, a computing device can represent a larger range of colors by changing to a color encoding scheme that uses more bits to encode color information. Generally, this involves a software change. However, an output device associated with a computing device may have hardware and/or consumables that are not so easily modified to change or increase the range of colors that can be represented. For example, a printer device, such as an inkjet printer, can generate a range of color that is limited by the colors of the ink available to the printer device and hardware used to dispense the ink onto a substrate.

Differences between a computing device's color space and an output device's color space can result in color mismatches. For example, a computing device may command an output device to generate an output that includes a color that the output device is not capable of producing. To address such potential color mismatches, certain computer programs are configured to choose a "next best" color to be used in place of a computer-specified color that is not producible by the output device.

In some cases, a poor color match between colors results in inefficiency and waste. As a particular example, selected branding colors associated with a company and other instances of those same branding colors, such as those found on that company's product, can appear "mismatched" due to poor color match. As a result, products are reworked until a "match" is identified, increasing expenses.

SUMMARY

In a particular example, a method includes receiving information specifying a color gamut. The color gamut corresponds to a range of colors producible by an output device. The method further includes receiving a first indication of a first color associated with a first point in a geometrical representation of the color gamut in a three-dimensional (3D) color space. The method further includes generating, based on the first color, a second indication of a second color that is included in the color gamut. The second color is associated with a second point in the 3D color space. The second point is identified based on a particular value of data associated with a plurality of distances between the first point and a subset of points of the geometrical representation. The subset of points includes more than one and fewer than all points of the geometrical representation.

In another particular example, an apparatus includes a memory configured to store instructions. The apparatus further includes a processor configured to receive information specifying a color gamut, to receive a first indication of a first color associated with a first point in a geometrical representation of the color gamut in a three-dimensional (3D) color space, and to execute the instructions to generate, based on the first color, a second indication of a second color that is included in the color gamut. The second color is associated with a second point in the 3D color space, and the color gamut corresponds to a range of colors producible by an output device. The second point is identified based on a particular value of data associated with a plurality of distances between the first point and a subset of points of the geometrical representation, and the subset of points includes more than one and fewer than all points of the geometrical representation.

In another particular example, a computer-readable storage medium stores instructions executable by a processor to perform, initiate, or control operations. The operations include receiving information specifying a color gamut. The color gamut corresponds to a range of colors producible by an output device. The operations further include receiving a first indication of a first color associated with a first point in a geometrical representation of the color gamut in a three-dimensional (3D) color space. The operations further include generating, based on the first color, a second indication of a second color that is included in the color gamut. The second color is associated with a second point in the 3D color space. The second point is identified based on a particular value of data associated with a plurality of distances between the first point and a subset of points of the geometrical representation. The subset of points includes more than one and fewer than all points of the geometrical representation.

BRIEF DESCRIPTION OF THE DRAWINGS

FIG. 5 is a block diagram illustrating aspects of an illustrative implementation of a vehicle that includes a component printed using a color selected using the device of FIG. 1 in accordance with an embodiment.

DETAILED DESCRIPTION

In a particular implementation, a device receives an indication of a first color and uses a subset of points of a geometrical representation of a color gamut corresponding to a range of colors producible by an output device (e.g., a printer device) to select a second color that is within the color gamut. In some implementations, the geometrical representation includes a plurality of triangular facets, and the subset of points corresponds to a particular triangular facet of the triangular facets that is nearest to a first point representing the first color in a three-dimensional (3D) color space.

In a particular example, the device identifies the triangular facet as being the nearest triangular facet to the first point based on coordinates in the 3D color space. After identifying the triangular facet, in a particular example, the device samples a base surface of the triangular facet to identify a plurality of sampling points and generates data indicating a distance function associated with each sampling point. In some implementations, the device determines (or "fits") a function (e.g., a spline function) to the data (e.g., using a regression analysis technique) and identifies a particular value (e.g., a critical point of the spline function). In some examples, the device selects a second point of the 3D color space corresponding to the critical point. The second point corresponds to a second color that is within the color gamut.

In some cases, selecting the second color using the triangular facet of the geometrical representation of the color gamut results in improved color match between the first color and the second color as compared to another technique. To illustrate, in some cases, selecting a color corresponding to a point in the 3D color space that is nearest the first point (e.g., based only on a Euclidean distance) result in a poor perceptual color match. For example, in some cases, using only Euclidean distance to select a color corresponding to a point in the 3D color space that is nearest the first point fails to accommodate for non-linear sensitivities of the human eye to different colors, resulting in poor color match. In some implementations, by sampling a subset of points of the geometrical representation to determine sampling points, fitting a function (e.g., a spline function or another function) to the sampling points, and by identifying a critical point of the sampling points, color match is improved.

Figure 1:
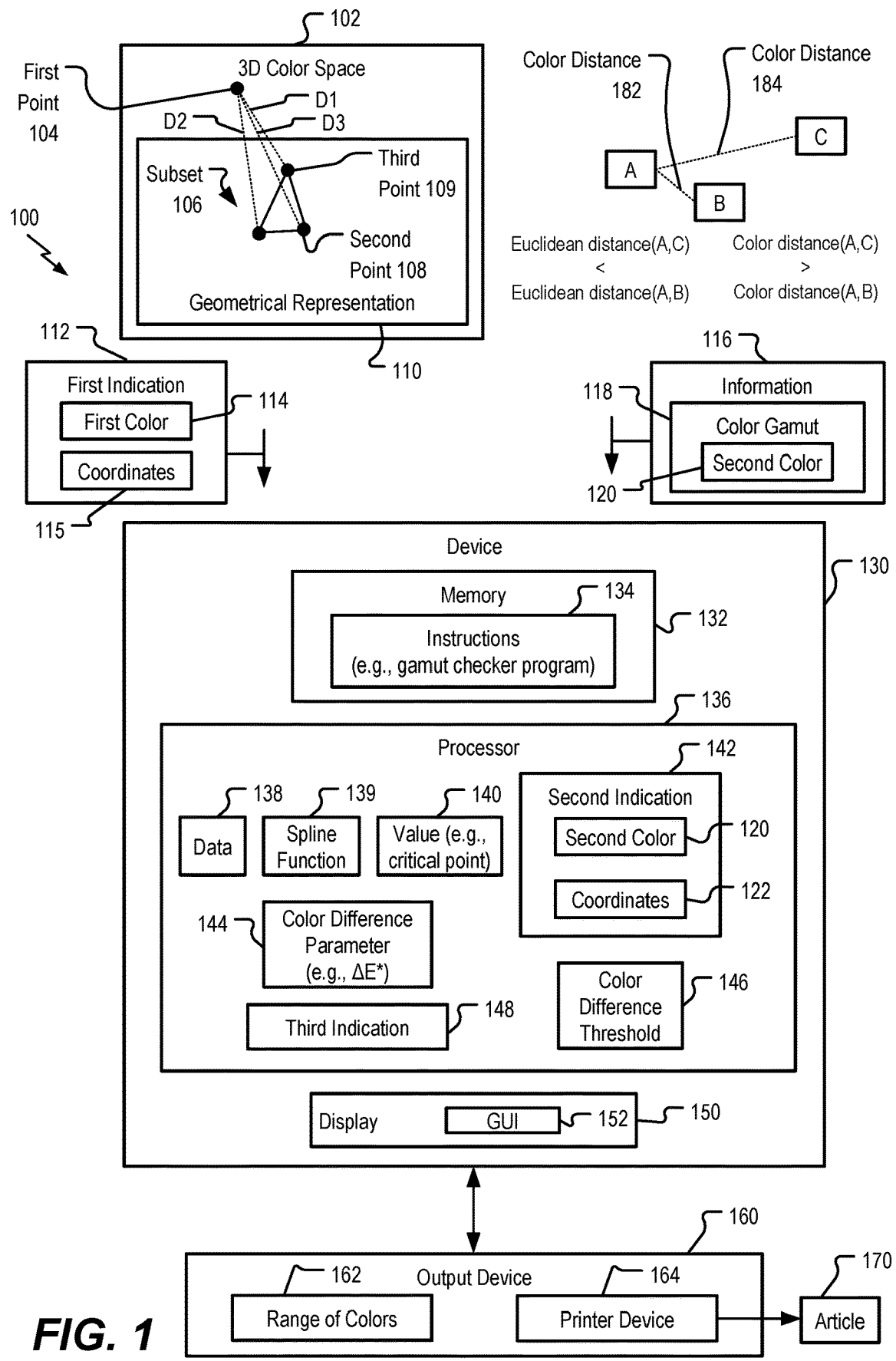
FIG. 1 is a diagram illustrating certain aspects of an example of a system including an output device and a device configured to determine a color within a range of colors producible by the output device in accordance with an embodiment.

Referring to FIG. 1, a particular illustrative example of a system is depicted and generally designated 100. In the example of FIG. 1, the system 100 includes a device 130 and an output device 160. In some implementations, the device 130 includes or corresponds to a computer (e.g., a server, a laptop computer, a desktop computer, or another computer), and the output device 160 includes or corresponds to a printer device. In some implementations, the device 130 may include the output device 160.

The device 130 includes a memory 132. The memory 132 is configured to store instructions 134. In some implementations, the instructions 134 include or correspond to a gamut checker program. The device 130 further includes a processor 136 coupled to the memory 132. The processor 136 is configured to retrieve the instructions 134 from the memory 132 and to execute the instructions 134 to initiate, perform, or control certain operations described herein.

In some implementations, the device 130 includes a display 150. In some examples, the display 150 is configured to present a graphical user interface (GUI) 152. In some implementations, the output device 160 includes or corresponds to a printer device 164. For example, the printer device 164 can include or correspond to an inkjet printer, a laser printer, a three-dimensional (3D) printer, another printer, or a combination thereof.

In some implementations, the device 130 is coupled to the output device 160 via a wired connection, such as a universal serial bus (USB) connection or another wired connection. Alternatively or in addition, in some implementations, the device 130 and the output device 160 are configured to communicate using a wireless connection.

During operation, the device 130 receives information 116 specifying a color gamut 118 (also referred to herein as a point cloud). In a particular example, the processor 136 is configured to receive the information 116. To illustrate, in some implementations, the information 116 is received from the output device 160. In some implementations, in response to connecting the device 130 to the output device 160 (e.g., via a wired connection, a wireless connection, or both), the output device 160 provides the information 116 to the device 130. In other examples, a user provides the information 116 via a user input device (e.g., by selecting colors of the color gamut via the GUI, via another user input device, or a combination thereof) or by downloading the information 116 using the Internet, as illustrative examples.

The color gamut 118 corresponds to a range of colors 162 that are producible by the output device 160. As a particular example, in some implementations, the output device 160 includes or corresponds to the printer device 164, and the range of colors 162 corresponds to a plurality colors that the printer device 164 can generate based on ink colors of the printer device 164 and ink dispensing characteristics of the printer device 164.

In a particular example, colors are represented using (or "mapped" to) a three-dimensional (3D) color space 102, where each color represented by the 3D color space 102 is associated with a corresponding plurality of coordinates within the 3D color space 102. In some examples, the 3D color space 102 corresponds to an International Commission on Illumination (CIE) L*, a*, and b* (CIELAB) color space, and each color within the 3D color space 102 is associated with a plurality of CIELAB coordinates.

The color gamut 118 is associated with a geometrical representation 110 in the 3D color space 102. To illustrate, in some implementations, the 3D color space 102 indicates a respective plurality of coordinates corresponding to each color of a plurality of colors within the 3D color space 102. In some examples, points within the geometrical representation 110 correspond to colors that are within the color gamut 118 (and that are included in the range of colors 162). For example, in FIG. 1, the 3D color space 102 includes a first point 104 that is outside the geometrical representation 110. In this example, a first color 114 associated with the first point 104 is outside the color gamut 118 (and is not included in the range of colors 162). As another example, in FIG. 1, the 3D color space 102 includes a second point 108 that is within the geometrical representation 110. In this example, a second color 120 associated with the second point 108 is within the color gamut 118 (and is included in the range of colors 162).

In some implementations, the device 130 is configured to "convert" the color gamut 118 to the geometrical representation 110. In a particular example, in response to receiving the information 116), the device 130 is configured to generate a file having a particular file format. In a particular example, the file indicates surface geometry of the geometrical representation 110, such as using a plurality of triangular faces in a three-dimensional Cartesian coordinate system. To further illustrate, in one non-limiting illustrative example, the file indicates a boundary representation (B-REP) solid model corresponding to the geometrical representation 110 and has a standard for the exchange of product model data (STEP) file format. In other implementations, the file has another file format. For example, in another non-limiting illustrative example, the file has a stereolithography (STL) file format.

In FIG. 1, a subset of points 106 of the geometrical representation 110 is shown for illustration. The subset of points 106 includes more than one and fewer than all points of the geometrical representation 110. In the example of FIG. 1, the subset of points 106 corresponds to a triangular facet. In some implementations, the geometrical representation 110 includes a plurality of triangular facets, as described further with reference to FIG. 2.

The processor 136 is configured to receive a first indication 112 of the first color 114 associated with the first point 104 in the 3D color space 102. In some examples, the first indication 112 specifies a first plurality of coordinates 115 (e.g., CIELAB coordinates) associated with the first point 104. To illustrate, in some examples, the first indication 112 corresponds to a request to determine whether the first color 114 is within the color gamut 118. Alternatively or in addition, in some implementations, the first indication 112 corresponds to a request to determine a color of the color gamut 118 that is nearest (in terms of human perception) the first color 114 (in case the first color 114 is not within the 3D color space 102). In some examples, the first indication 112 is received at the device 130 in response to user input. To illustrate, in some implementations, a user provides the information 116 via a user input device (e.g., by selecting the first color 114 via the GUI, via another user input device, or a combination thereof) or by sending the first indication 112 using the Internet, as illustrative examples.

In response to the first indication 112, the processor 136 is configured to execute the instructions 134 to determine whether the first color 114 is within the color gamut 118. In the example of FIG. 1, the first color 114 is associated with the first point 104, and the first point 104 is outside the geometrical representation 110 of the color gamut 118. In this case, the processor 136 is configured to execute the instructions 134 to determine that the first color 114 is external to the geometrical representation 110. In some examples, the processor 136 is configured to determine that the first color 114 is external to the geometrical representation 110 in the 3D color space 102 based on the first plurality of coordinates 115 associated with the first color 114 and specified by the first indication 112.

In other examples, the processor 136 is configured to determine that a color is within the color gamut 118. As an example, in response to receiving a particular indication of the second color 120, the processor 136 is configured to execute the instructions 134 to determine that the second point 108 associated with the second color 120 is within the color gamut 118.

The processor 136 is configured to execute the instructions 134 to generate, based on the first color 114, an indication of another color that is included in the color gamut 118, such as by generating a second indication 142 of the second color 120. In some examples, the second color 120 is an approximation of the first color 114. In some implementations, the second indication 142 specifies a second plurality of coordinates 122 (e.g., CIELAB coordinates) of the second point 108 in the 3D color space 102.

In some implementations, the processor 136 is configured to execute the instructions 134 to identify the second color 120 based on a particular value 140 of data 138 associated with a plurality of distances (D1, D2, and D3) between the first point 104 and the subset of points 106 of the geometrical representation 110. To further illustrate, in some implementations, the processor 136 is configured to execute the instructions 134 to determine a function (e.g., a spline function 139) using a regression analysis technique and based on the plurality of distances (D1, D2, and D3) indicated by the data 138. In a particular example, the processor 136 is configured to determine a function (e.g., the spline function 139) by identifying that the function "fits" data points of the data 138. In some implementations, the processor 136 is configured to identify a critical point of the spline function 139 to determine the particular value 140.

In some implementations, a critical point of the spline function 139 corresponds to a point at which the second derivative of the spline function 139 changes sign (from positive to negative, or from negative to positive). In a particular illustrative example, the spline function 139 corresponds to a function that has a particular point at which the second derivative of the spline function 139 changes sign. In this particular example, the processor 136 is configured to select the particular point as the critical point of the spline function 139.

Although certain examples are described with reference to the second point 108 of FIG. 1 corresponding to a critical point of the spline function 139 for illustration, it should be noted that in other examples other points of the subset of points 106 can correspond to a critical point of the spline function 139. Further, it is noted that the features of FIG. 1 are not drawn to scale and are provided as a non-limiting example for purposes of illustration.

In some implementations, a distance is measured from the first point 104 to a point in the geometrical representation 110 (instead of from the point in the geometrical representation 110 to the first point 104). For example, in some color schemes measuring the distance D3 from the first point 104 to the second point 108 produces a different result as compared to measuring the distance D3 from the second point 108 to the first point 104. Thus, in a particular example, the distance D3 corresponds to distance from the first point 104 to the second point 108 (instead of from the second point 108 to the first point 104).

To further illustrate, in a particular example, the processor 136 is configured to execute the instructions 134 to identify the subset of points 106 (e.g., a triangular facet) as being the nearest triangular facet to the first point 104 (e.g., using coordinates in the 3D color space 102). After identifying the subset of points 106 as the nearest triangular facet, in a particular example, the processor 136 is configured to sample a base surface of the subset of points 106 to identify a plurality of sampling points and to generate the data 138 indicating a distance associated with each sampling point (e.g., the distances D1, D2, and D3). In some implementations, the processor 136 is configured to determine (or "fit") the spline function 139 to the data 138 (e.g., using a regression analysis technique, such as a least squares regression analysis technique) and to identify the particular value 140 (e.g., a critical point of the spline function 139).

In some examples, the processor 136 is configured to select the second color 120 based on the particular value 140. For example, in some implementations, each value of the data 138 is associated with a corresponding distance from the first point 104 to a corresponding point in the geometrical representation 110, and the particular value 140 corresponds to or indicates a distance (e.g., the distance D3) from the first point 104 to the second point 108.

In some implementations, choosing the second color 120 based on the particular value 140 improves color match. To illustrate, in a particular example, the particular value 140 indicates that the second point 108 is a critical point of the spline function 139. In some implementations, a critical point of the spline function 139 corresponds to a point of the geometrical representation 110 that is associated with a visually distinct color of the color gamut 118. For example, in some cases, a critical point of the spline function 139 is associated with a derivative of zero, which may indicate that distances "converge" to the critical point, indicating that the critical point corresponds to the best match color.

In some cases, selecting a point of the geometrical representation 110 based on the data 138 results in a better color match (in terms of human perception) as compared to selecting a point of the geometrical representation 110 that minimizes a Euclidean distance between the first point 104 and the selected point. To illustrate, in some cases, measuring color likeness using a standard Euclidean metric is only crudely accurate with respect to human vision perception. As a result, certain functions have been developed that more closely measure color likeness with respect to human vision perception (as compared to Euclidean distance). In accordance with the disclosure, a closest color match can be identified based on minimizing color distance with respect to any specified color distance function (as opposed to minimizing Euclidean distance between colors and then converting that distance to the specified distance function value, which can be inaccurate in some cases).

To further illustrate, in some cases, minimizing a Euclidean distance between points of the color space 102 does not necessarily minimize a color distance (e.g., in terms of human perception). For example, FIG. 1 illustrates a color distance 182 between a first color A (e.g., the first color 114 corresponding to the first point 104) and a second color B (e.g., the second color 120 corresponding to the second point 108). FIG. 1 also illustrates a color distance 184 between the first color A and a third color C corresponding to a third point 109 in the 3D color space 102. In this particular example, minimizing Euclidean distance results in selection of the third color C (because the distance D1 is less than the distance D3 in the 3D color space 102 in the example of FIG. 1). As illustrated in FIG. 1, in some cases, minimizing the Euclidean distance results in poor color match, since for example color distance would be reduced by selection of the second color B (reducing color distance from the color distance 184 to the color distance 182). Thus, in some cases, for colors A, B, and C, Euclidean distance (A,C)<Euclidean distance (A,B), but color distance (A,C)>color distance (A,B). In this case, selection of a color by minimizing Euclidean distance can result in poor color match.

To further illustrate, in a particular non-limiting example, the points 104, 108, and 109 are each associated with a plurality of coordinates within the 3D color space 102, such as lightness (L*), red/green (a*), and yellow/blue (b*) (LAB) coordinates. In a particular non-limiting example, the first point 104 is associated with coordinates of 7.879, 15.507, and −32.953, the second point 108 is associated with coordinates 8.863, 13.457, and −33.000, and the third point 109 is associated with coordinates 9.429, 14.477, and −32.133. Certain conventional devices determine, based on Euclidean distance, that the third point 109 is nearest to the first point 104 and select a color corresponding to the third point 109 as matching the first color 114 (based on the Euclidean distance). In some cases, a color distance between the first point 104 and the third point 109 may be greater than a color distance between the first point 104 and the second point 108 (resulting in poor color match in this example). In one example, the color distance between the first point 104 and the third point 109 with respect to CIE94 is 1.666, and the color distance the first point 104 and the second point 108 with respect to CIE94 is 1.605. Accordingly, in this illustrative example, color match is improved by selecting the second color 120 instead of selecting a third color corresponding to the third point 109.

In some implementations, the processor 136 is configured to output the second indication 142 of the second color 120 to one or more devices. As an example, in some implementations, the processor 136 is configured to send the second indication 142 of the second color 120 to the output device 160, such as to initiate a print operation that uses the second color 120 in place of the first color 114. Alternatively or in addition, in some implementations, the processor 136 is configured to send the second indication 142 of the second color 120 to the display 150 for presentation using the GUI 152. In a particular example, the display 150 is configured to present the GUI 152 indicating the first color 114 and the second color 120 (e.g., to enable a user to visually confirm that the second color 120 as a perceptual match for the first color 114). In this example, in some implementations, a user is presented an option to confirm (or disconfirm), via the GUI 152, that the second color 120 matches the first color 114.

In some cases, the spline function 139 includes multiple critical points, and the data 138 indicates multiple values corresponding to the multiple critical points. In this case, the device 130 is configured to perform one or more operations to select (or to prompt a user to select) a particular color of multiple colors corresponding to the multiple critical points. To illustrate, in a particular example, multiple representations of the multiple colors are presented via the GUI 152 to enable a user to select one of the multiple colors (e.g., as a "tie-breaker"). In another example, a critical point corresponding to the point of the subset of points 106 having the least Euclidean distance to the first point 104 is selected from among the multiple critical points (e.g., as a "tie-breaker").

In some implementations, the processor 136 is configured to determine a color difference parameter 144 associated with the first color 114. In a particular example, a relatively low value (e.g., a value that is less than or equal to a color difference threshold 146) of the color difference parameter 144 indicates a match between the first color 114 and the second color 120. In a particular example, the color difference parameter 144 corresponds to a delta empfindung ($\Delta E^*$) value, such as a CIE94 $\Delta E^*$ value, as an illustrative example. In some implementations, a $\Delta E^*$ value indicates a level of visual difference (in terms of human perception) between colors (e.g., where a greater $\Delta E^*$ value indicates a greater perceived color difference, and where a smaller $\Delta E^*$ value indicates less perceived color difference).

In some implementations, the processor 136 is configured to compare the color difference parameter 144 to the color difference threshold 146 (e.g., to determine whether the second color 120 matches the first color 114). In some examples, the color difference threshold 146 corresponds to a $\Delta E^*$ value. In a particular example, the processor 136 is configured to output a third indication 148 of whether the color difference parameter 144 satisfies (e.g., is less than or less than or equal to) the color difference threshold 146. In some implementations, the display 150 is configured to present, via the GUI 152, the third indication 148 of whether the color difference parameter 144 satisfies the color difference threshold 146.

In some implementations, the color difference threshold 146 is specified by user input to the device 130. For example, the color difference threshold 146 can be specified as a data element in the first indication 112. In some implementations, in response to the color difference parameter satisfying (e.g., being greater than or greater than or equal to) the color difference threshold 146, the processor 136 is configured to initiate display of a message (e.g., an error message) via the GUI 152. In some examples, the message requests confirmation of the second color 120 (despite a relatively large value of the color difference parameter 144).

In some implementations, the processor 136 is configured to initiate an output operation at the output device 160 based on the second color 120 (e.g., after confirmation of the second color 120 via the GUI 152). For example, in some implementations, the processor 136 is configured to initiate a print operation at the printer device 164 based on the second color 120. In a particular example, the printer device 164 is configured to print an article 170 (e.g., a piece of livery wear, or another article) using the second color 120 in place of the first color 114. In some implementations, the printer device 164 prints the article 170 using a particular color of a material (e.g., an ink, a toner, or a 3D printer filament, as illustrative examples) selected based on the second indication 142 and from among a plurality of materials corresponding to the range of colors 162.

To further illustrate, in a particular example, the article 170 corresponds to or includes aircraft livery. In one example, the article 170 is associated with a particular airline. In some examples, the article 170 includes a portion of an aircraft or insignia to be attached to a portion of an aircraft, and the portion identifies the particular airline using a logo or other information associated with the particular airline. In some examples, the printer device 164 is capable of printing on structures of a large vehicle (e.g., components of an aircraft, a ship, a rocket, a bus, or another vehicle). In a particular example, the article 170 includes a portion of an aircraft (e.g., a portion of an airframe of the aircraft), and the printer device 164 is configured to print the second color 120 on the portion in connection with printing aircraft livery to the portion. As used herein, "printing" an article (such as the article 170) based on a color includes applying the color to a particular object (e.g., by applying ink, paint, or other material to a vehicle component using painting or another coloration process) as well as fabricating an object (e.g., using a 3D printer) using a material (e.g., a 3D printer filament) having the color.

In some implementations, in response to selecting the second color 120, the device 130 is configured to prompt a user based on the second color 120. In a particular example, the device 130 is configured to indicate a change to an output device (e.g., a printer or a display, as illustrative examples) to improve color match. In some examples, the device 130 is configured to prompt the user to modify a printer color of a printer or to adjust a display setting (e.g., contrast, brightness, or another setting) in order to match the second color 120.

Although certain components are described separately for convenience, it will be appreciated that certain components can be combined without departing from the scope of the disclosure. For example, in some implementations, the output device 160 includes one or more of the memory 132, the processor 136, or the display 150.

Although certain aspects of FIG. 1 are described with reference to a single first color 114, in other implementations, a plurality of colors is used. In a particular example, the first indication 112 specifies a first plurality of colors (including the first color 114), and the second indication 142 specifies a second plurality of colors (including the second color 120) included in the color gamut 118.

In some cases, selecting the second color 120 based on the subset of points 106 increases a color match (e.g., by decreasing the color difference parameter 144) as compared to selecting a particular color using another technique. For example, in some cases, by selecting the second color 120 based on the subset of points 106, a value of the color difference parameter 144 is reduced as compared to selecting a point of the geometrical representation 110 based on a point that minimizes a Euclidean distance to the first point 104. As a result, color match is improved.

Further, in some cases, use of the subset of points 106 improves operation of the device 130. For example, in cases where the geometrical representation 110 includes a large number of points (and where the color gamut 118 includes a large number of colors), determining the data 138 for all points of the geometrical representation 110 may be computationally difficult and may increase memory usage. By using the subset of points 106, multiple points of the geometrical representation 110 can be "tested" for color match without accessing each point of the geometrical representation 110, reducing computational complexity and memory usage.

Figure 2:
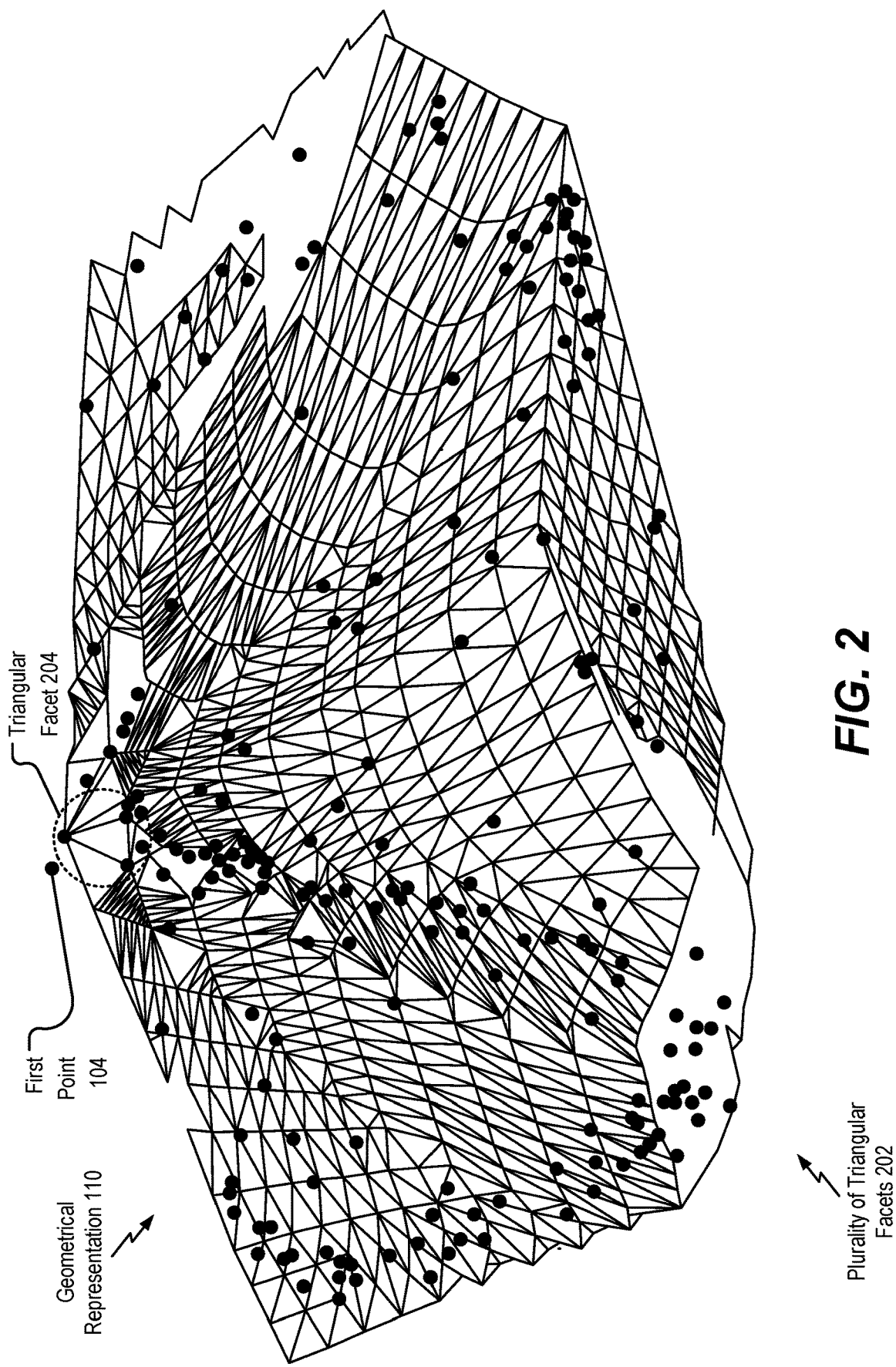
FIG. 2 is a diagram illustrating certain aspects associated with an example of a geometrical representation of a color gamut corresponding to the range of colors producible by the output device of FIG. 1 in accordance with an embodiment.

FIG. 2 depicts a particular illustrative example of the geometrical representation 110. It will be appreciated that the example of FIG. 2 is illustrative and that other examples are also within the scope of the disclosure.

In the example of FIG. 2, the geometrical representation 110 includes a plurality of triangular facets 202 (e.g., where the geometrical representation 110 includes a "mesh" of triangular facets). FIG. 2 also illustrates an example where the subset of points 106 corresponds to a particular triangular facet 204 of the plurality of triangular facets 202. The particular triangular facet 204 is nearest to the first point 104 as compared to other triangular facets of the plurality of triangular facets 202. To illustrate, in some examples, the processor 136 of FIG. 1 is configured to identify that the particular triangular facet 204 is nearest to the first point 104 based on a determination that the particular triangular facet 204 includes a point that is nearest to the first point 104 in terms of Euclidean distance. To illustrate, in the example of FIG. 2, the third point 109 is nearest to the first point 104 in terms of Euclidean distance. In this example, the processor 136 is configured to determine, based on the particular triangular facet 204 including the third point 109 that is nearest to the first point 104, that the particular triangular facet 204 is nearest to the first point 104 as compared to other triangular facets of the plurality of triangular facets 202.

Alternatively or in addition, in other implementations, the processor 136 is configured to select the particular triangular facet 204 using another technique, such as an average distance technique. To illustrate, in one example, the processor 136 is configured to sample multiple triangular facets of the plurality of triangular facets 202, such as by sampling each triangular facet of the plurality of triangular facets 202 at multiple points (e.g., a set of evenly distributed points on each triangular facet) to determine a value of a distance function. In this example, the processor 136 is configured to select the particular triangular facet 204 by determining that an absolute value of the distance function that is associated with the particular triangular facet 204 is less than absolute values of the distance function that are associated with other triangular facets of the plurality of triangular facets 202.

In some examples, the geometrical representation 110 corresponds to a sphere (not shown in FIG. 2) that is mapped to (or represented using) the plurality of triangular facets 202. In some examples, each vertex of a triangular facet of the plurality of triangular facets 202 corresponds to a color that is included within the color gamut 118 of FIG. 1. In some examples, the subset of points 106 includes points corresponding to vertices of the triangular facet that is nearest to the first point 104.

In a particular example, the processor 136 is configured to execute the instructions 134 to determine that the triangular facet corresponding to the subset of points 106 (e.g., the particular triangular facet 204) is nearest to the first point 104 as compared to other triangular facets of the plurality of triangular facets 202. For example, in some implementations, the information 116 specifies a set of one or more coordinates associated with each triangular facet of the plurality of triangular facets 202, and the processor 136 is configured to execute the instructions 134 to determine which set of one or more coordinates is nearest to the first point 104 in the 3D color space 102.

In some implementations, the display 150 is configured to present, via the GUI 152, the geometrical representation 110 (or a portion of the geometrical representation 110). In some implementations, the GUI 152 presents a user option to select a color scheme (e.g., a shading or a transparency) of the geometrical representation 110. As a particular example, in some implementations, the GUI 152 presents a scroll bar that enables a user to increase or decrease transparency of the geometrical representation 110. In some examples, the GUI 152 presents lines from the first point 104 to points in the 3D color space 102 that are within the geometrical representation 110, that are outside the geometrical representation 110, or both.

Although certain aspects are described with reference to a single triangular facet 204, in some implementations, the subset of points 106 includes multiple triangular facets of the plurality of triangular facets 202. For example, the subset of points 106 may include the nearest N triangular facets to the first point 104 (where N is a positive integer greater than one). It is also noted that in some examples, the geometrical representation 110 includes a continuous (or near-continuous) set of points corresponding to the color gamut 118 (instead of including a discrete set of points corresponding to the color gamut 118).

Accordingly, in a particular example, selection of a nearest point of the geometrical representation 110 to the first point 104 (e.g., based only on a Euclidean distance, as in certain conventional techniques) results in a single closest point to the first point 104. In accordance with at least some aspects of the disclosure, multiple points of the geometrical representation 110 are selected (e.g., by selecting the subset of points 106, which corresponds to a triangular facet in the example of FIG. 2), and a color corresponding to one of the multiple points is chosen.

In some examples, by determining that the particular triangular facet 204 is nearest to the first point 104 as compared to other triangular facets of the plurality of triangular facets 202, the processor 136 is enabled to select the subset of points 106. In some implementations, selecting the second color 120 based on the subset of points 106 results in a reduced value of the color difference parameter 144 as compared to selecting a point of the geometrical representation 110 based on a point that minimizes a Euclidean distance to the first point 104. In this manner, color match is improved.

Figure 3:
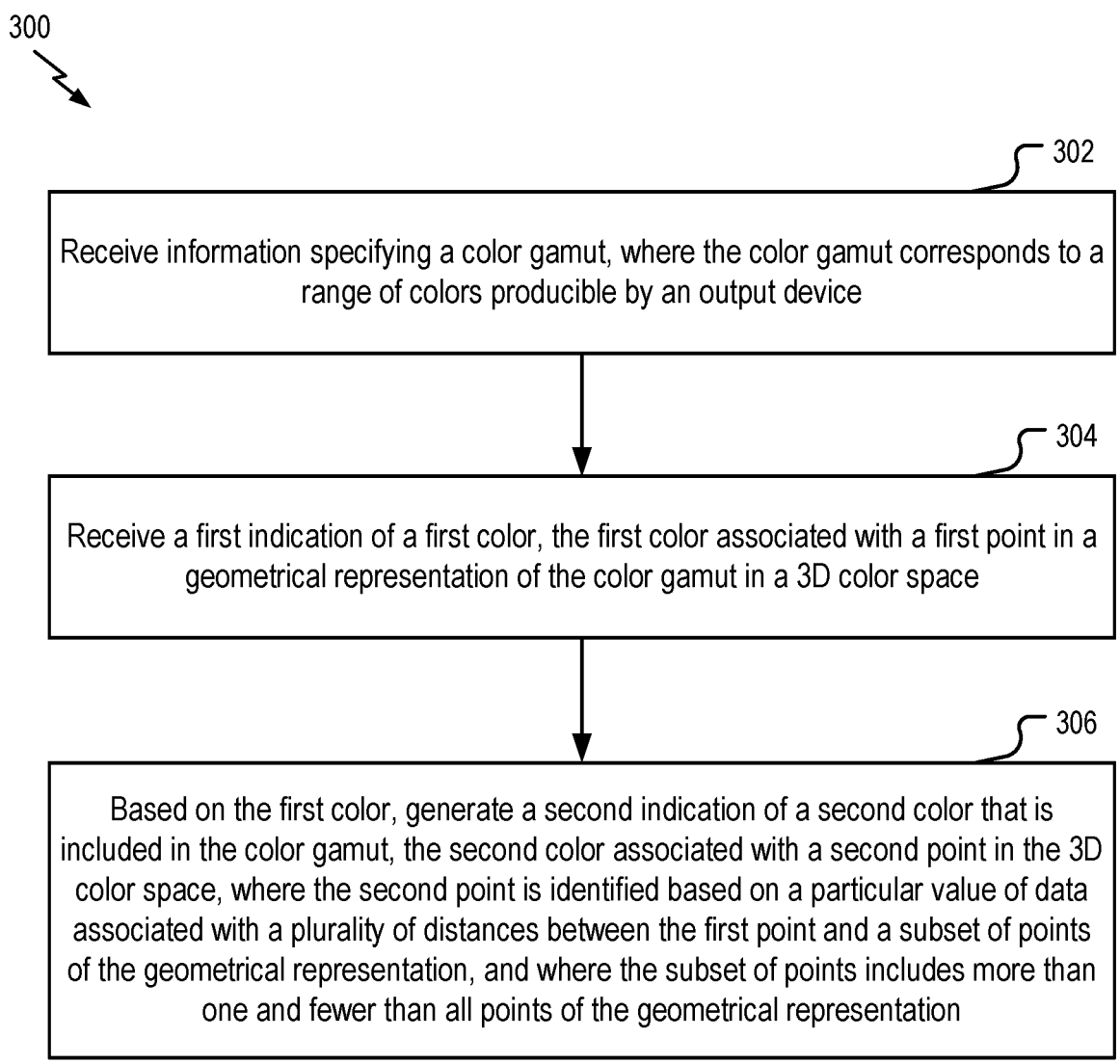
FIG. 3 is a diagram of an example of a method of operation of the device of FIG. 1 in accordance with an embodiment.

Referring to FIG. 3, a particular illustrative example of a method is depicted and generally designated 300. In a particular implementation, operations of the method 300 are initiated, performed, or controlled by the processor 136, such as by executing the instructions 134.

The method 300 includes receiving information specifying a color gamut, at 302. The color gamut corresponds to a range of colors producible by an output device. To illustrate, in one example, the device 130 is configured to receive the information 116 specifying the color gamut 118. The color gamut 118 corresponds to the range of colors 162 producible by the output device 160.

The method 300 further includes receiving a first indication of a first color, at 304. The first color is associated with a first point in a geometrical representation of the color gamut in a 3D color space. To illustrate, in one example, the device 130 is configured to receive the first indication 112 of the first color 114, and the first color 114 is associated with the first point 104 in the 3D color space 102. The color gamut 118 is associated with the geometrical representation 110 in the 3D color space 102.

The method 300 further includes generating, based on the first color, a second indication of a second color that is included in the color gamut, at 306. The second color is associated with a second point in the 3D color space. The second point is identified based on a particular value of data associated with a plurality of distances between the first point and a subset of points of the geometrical representation (e.g., by selecting the second point based on a determination that the second point corresponds to a critical point of the data). The subset of points includes more than one and fewer than all points of the geometrical representation. To illustrate, in one example, the device 130 is configured to generate, based the first color 114, the second indication 142 of the second color 120. The second color 120 is associated with the second point 108 in the 3D color space 102, and the second point 108 is identified based on the particular value 140 of the data 138 associated with the plurality of distances (D1, D2, and D3) between the first point 104 and the subset of points 106. As a particular illustrative example, identifying the second point 108 based on the particular value 140 may include determining that the particular value 140 is a critical point of data values of the data 138. The subset of points 106 includes more than one and fewer than all points of the geometrical representation 110.

In some examples of the method 300, the output device comprises a printer device, and the method 300 further includes printing an article by the printer device, the article including the second color in place of the first color. In a particular example, the printer device 164 prints the article 170 using the second color 120. In some implementations, printing the article 170 using the second color 120 determined using the data 138 improves color match between the article 170 and the first color 114, reducing or avoiding instances of reprinting of the article 170 using another color that "matches" the first color 114.

In some implementations, the article includes a component of an aircraft, and printing the article includes printing the second color on the component of the aircraft. In some cases, printing a component of an aircraft using the second color 120 reduces or avoids instances of reprinting the article using another color that "matches" the first color 114 (which can be expensive in some cases, such as in the case of an aircraft skin, as an illustrative example).

In some examples of the method 300, the second indication is generated based on a determination that the first color is external to the geometrical representation in the 3D color space. For example, in some implementations, the processor 136 is configured to generate the second indication 142 based on a determination that the first color 114 is external to the geometrical representation 110 in the 3D color space 102. In some examples, generating the second indication 142 based on a determination that the first color 114 is external to the geometrical representation 110 enables the processor 136 efficiently select a color in response to determining that the first color 114 is not within the range of colors 162 producible by the output device 160.

In some examples of the method 300, the geometrical representation includes a plurality of triangular facets. For example, FIG. 2 describes an example in which the geometrical representation 110 includes a plurality of triangular facets. In some implementations, use of triangular facets of the geometrical representation 110 improves accuracy of color selection as compared to other techniques.

In some implementations of the method 300, the subset of points corresponds to a particular triangular facet of the plurality of triangular facets that is nearest to the first point as compared to other triangular facets of the plurality of triangular facets. For example, in FIG. 2, the subset of points 106 corresponds to a triangular facet of the geometrical representation 110 that is nearest (e.g., based on a Euclidean distance) to the first point 104 as compared to other triangular facets of the geometrical representation 110. In some implementations, selection of the triangular facet nearest to the first point 104 as compared to other triangular facets of the geometrical representation 110 improves accuracy of color selection as compared to other techniques. For example, in some cases, selection of a point with the triangular facet results in selection of a color that is not necessarily nearest a desired color in terms of Euclidean distance (which may not necessarily result in color match) but that looks similar to the desired color (in terms of human visual perception).

In some implementations, the method 300 further includes determining, using a regression analysis technique, a spline function based on the plurality of distances to generate the data and identifying a critical point of the spline function to determine the particular value. For example, in some implementations, the processor 136 is configured to determine the spline function 139 based on the plurality of distances (D1, D2, and D3) and to identify the particular value 140. In some implementations, selection of the second color 120 based on the value 140 improves accuracy of color selection as compared to other techniques.

In some examples of the method 300, selecting the second color based on the subset of points decreases a color difference parameter associated with the first color as compared to selecting a particular color based only on a Euclidean distance between the particular color and the first color within the 3D color space. To illustrate, in some implementations, selection of the second color 120 based on the subset of points 106 decreases the color difference parameter 144 as compared to other techniques. As a result, color match is improved.

In some implementations, the method 300 further includes comparing the color difference parameter to a color difference threshold. For example, in some implementations, the processor 136 is configured to compare the color difference parameter 144 to the color difference threshold 146. In some implementations, comparing the color difference parameter 144 to the color difference threshold 146 enables the processor 136 to confirm that the second color 120 is visually similar to the first color 114. As a result, color match is improved.

In some implementations, the color difference threshold corresponds to a ΔE* value. In some examples, use of a ΔE* value enables efficient quantification of an amount of difference between colors, such as the first color 114 and the second color 120.

In some implementations, the method 300 further includes outputting a third indication of whether the color difference parameter satisfies the color difference threshold. In one example, the device 130 outputs the third indication 148 (e.g., via the GUI 152). In some implementations, outputting the third indication 148 enables user confirmation that the second color 120 perceptually matches the first color 114, improving color selection accuracy.

In some implementations of the method 300, the first indication specifies a first plurality of coordinates within the 3D color space, and the second indication specifies a second plurality of coordinates within the 3D color space. To illustrate, in some examples, the first indication 112 specifies the first plurality of coordinates 115, and the second indication 142 specifies the second plurality of coordinates 122. In some implementations, use of the pluralities of coordinates 115, 122 enables precise identification of colors, such as the colors 114, 120.

In some implementations, selecting a color based on a subset of points increases (or improves) a color match (e.g., by decreasing the color difference parameter 144) as compared to selecting a particular color using another technique. For example, in some cases, color match is increased as compared to selecting a point of the geometrical representation 110 based on a point that minimizes a Euclidean distance to the first point 104. As a result, color match is improved.

Figure 4:
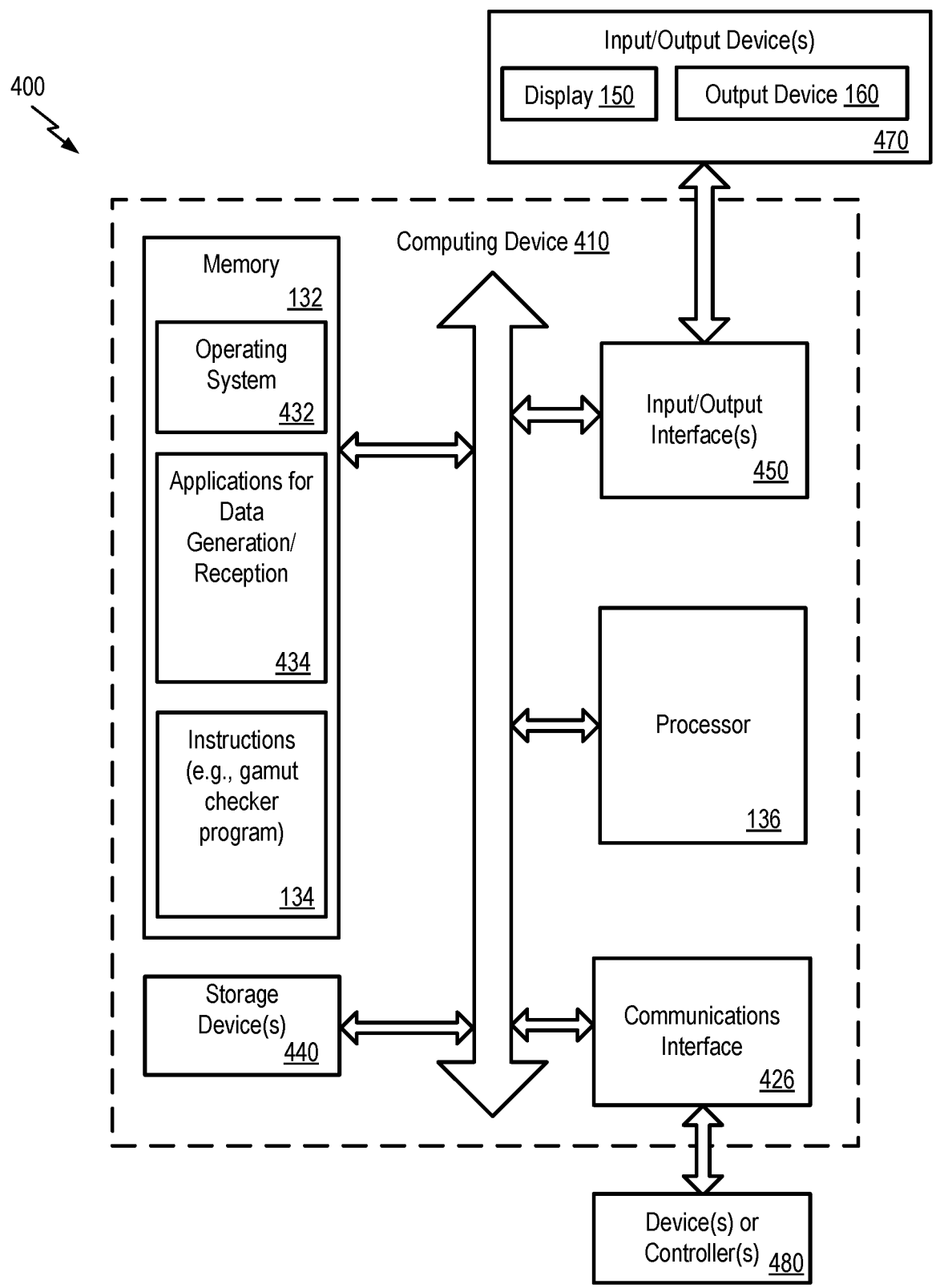
FIG. 4 is a block diagram illustrating aspects of an example of a computing system that is configured to execute instructions to initiate, perform, or control operations of the method of FIG. 3 in accordance with an embodiment.

FIG. 4 is an illustration of a block diagram of a computing environment 400 including a computing device 410 (e.g., a general-purpose computing device) configured to support embodiments of computer-implemented methods and computer-executable program instructions (or code) according to the present disclosure. In some examples, the computing device 410, or portions thereof, executes instructions to initiate, perform, or control operations described herein. For example, the computing environment 400 may be used to implement the method 300 described in relation to FIG. 3.

The computing device 410 includes the processor 136. The processor 136 is configured to communicate with the memory 132 (e.g., a system memory or another memory), one or more storage devices 440, one or more input/output interfaces 450, a communications interface 426, or a combination thereof.

Depending on the particular implementation, the memory 132 includes volatile memory devices (e.g., random access memory (RAM) devices), nonvolatile memory devices (e.g., read-only memory (ROM) devices, programmable read-only memory, or flash memory), one or more other memory devices, or a combination thereof. In FIG. 4, the memory 132 stores an operating system 432, which can include a basic input/output system for booting the computing device 410 as well as a full operating system to enable the computing device 410 to interact with users, other programs, and other devices. The particular example of FIG. 4 also depicts that the memory 132 stores one or more applications 434 executable by the processor 136. In some examples, the one or more applications 434 include instructions executable by the processor 136 to transmit signals between components of the computing device 410, such as the memory 132, the one or more storage devices 440, the one or more input/output interfaces 450, the communications interface 426, or a combination thereof.

In some implementations, one or more storage devices 440 include nonvolatile storage devices, such as magnetic disks, optical disks, or flash memory devices. In some examples, the one or more storage devices 440 include removable memory devices, non-removable memory devices or both. In some cases, the one or more storage devices 440 are configured to store an operating system, images of operating systems, applications, and program data. In a particular example, the memory 132, the one or more storage devices 440, or both, include tangible computer-readable media.

In the example of FIG. 4, the processor 136 is configured to communicate with the one or more input/output interfaces 450 to enable the computing device 410 to communicate with one or more input/output devices 470 to facilitate user interaction. In some implementations, the one or more input/output interfaces 450 include serial interfaces (e.g., universal serial bus (USB) interfaces or Institute of Electrical and Electronics Engineers (IEEE) 1394 interfaces), parallel interfaces, display adapters, audio adapters, one or more other interfaces, or a combination thereof. In some examples, the one or more input/output devices 470 include keyboards, pointing devices, displays, speakers, microphones, touch screens, one or more other devices, or a combination thereof. In some examples, the processor 136 is configured to detect interaction events based on user input received via the one or more input/output interfaces 450. Additionally, in some implementations, the processor 136 is configured to send a display to a display device via the one or more input/output interfaces 450. In some implementations, the one or more input/output devices 470 include the display 150, the output device 160, one or more other devices, or a combination thereof.

In a particular example, the processor 136 is configured to communicate with (or send signals to) one or more devices 480 using the communications interface 426. In some implementations, the communications interface 426 includes one or more wired interfaces (e.g., Ethernet interfaces), one or more wireless interfaces that comply with an IEEE 802.11 communication protocol, one or more other wireless interfaces, one or more optical interfaces, or one or more other network interfaces, or a combination thereof. In some examples, the one or more devices 480 include host computers, servers, workstations, one or more other computing devices, or a combination thereof.

Aspects of the disclosure can be described in the context of an example of a vehicle. A particular example of a vehicle is an aircraft 500 as shown in FIG. 5.

In the example of FIG. 5, the aircraft 500 includes an airframe 518 with a plurality of systems 520 and an interior 522. Examples of the plurality of systems 520 include one or more of a propulsion system 524, an electrical system 526, an environmental system 528, and a hydraulic system 530. Any number of other systems may be included.

In the example of FIG. 5, the aircraft 500 includes a component 540 having one or more colors selected in accordance with one or more aspects of the disclosure (e.g., using the method 300 of FIG. 3). In FIG. 5, the component 540 includes aircraft livery 542 having the second color 120. In some examples, the component 540 is fabricated or colored using the output device 160 of FIG. 1 (e.g., by printing the second color 120 on the component 540 using the printer device 164).

To illustrate, in some examples, the component 540 is included in the airframe 518. In one example, the component 540 includes or corresponds to an exterior component of the aircraft 500, such as a skin portion of the aircraft 500. Alternatively or in addition, in other examples, the component 540 includes or corresponds to another component of the aircraft 500, such as component of the interior 522 that includes the aircraft livery 542.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate, but do not limit, the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A method comprising:
receiving information specifying a color gamut, wherein the color gamut corresponds to a range of colors producible by an output device;
receiving a first indication of a first color, the first color associated with a first point in a geometrical representation of the color gamut in a three-dimensional (3D) color space, wherein each point of the geometrical representation corresponds to a color of the color gamut;
based on the first color, generating a second indication of a second color that is included in the color gamut, the second color associated with a second point in the 3D color space, wherein the second point is identified based on a particular value of data associated with a plurality of color distances between the first point and a subset of points of the geometrical representation, wherein the color distances are determined using a color distance function, wherein the subset of points includes more than one and fewer than all points of the geometrical representation, and wherein a third point in the geometrical representation has a shorter Euclidian distance to the first point than an Euclidian distance between the first point and the second point; and
generating an output by the output device, the output including the second color in place of the first color.

2. The method of claim 1, wherein the output device comprises a printer device, and wherein generating the output comprises printing an article by the printer device, the article including the second color in place of the first color.

3. The method of claim 2, wherein the article includes a component of an aircraft, and wherein printing the article includes printing the second color on the component of the aircraft.

4. The method of claim 1, wherein the geometrical representation includes a plurality of triangular facets.

5. The method of claim 4, wherein the subset of points corresponds to a particular triangular facet of the plurality of triangular facets that is nearest to the first point as compared to other triangular facets of the plurality of triangular facets.

6. The method of claim 1, further comprising:
using a regression analysis technique, determining a spline function based on the plurality of color distances to generate the data; and
identifying a critical point of the spline function to determine the particular value.

7. The method of claim 1, wherein the output device comprises a display device, and wherein generating the output comprises displaying the second color on the display device in place of the first color.

8. The method of claim 1, further comprising comparing a color difference parameter associated with the first color to a color difference threshold.

9. The method of claim 8, wherein the color difference threshold corresponds to a delta empfindung ($\Delta E^*$) value.

10. The method of claim 8, further comprising outputting a third indication of whether the color difference parameter satisfies the color difference threshold.

11. The method of claim 1, wherein the first indication specifies a first plurality of coordinates within the 3D color space, and wherein the second indication specifies a second plurality of coordinates within the 3D color space.

12. An apparatus comprising:
a memory configured to store instructions; and
a processor configured to:
receive information specifying a color gamut;
receive a first indication of a first color associated with a first point in a geometrical representation of the color gamut in a three-dimensional (3D) color space, wherein each point of the geometrical representation corresponds to a color of the color gamut;
execute the instructions to generate, based on the first color, a second indication of a second color that is included in the color gamut, the second color associated with a second point in the 3D color space, wherein the color gamut corresponds to a range of colors producible by an output device, wherein the second point is identified based on a particular value of data associated with a plurality of color distances between the first point and a subset of points of the geometrical representation, wherein the color distances are determined using a color distance function, wherein the subset of points includes more than one and fewer than all points of the geometrical representation, and wherein a third point in the geometrical representation has a shorter Euclidian distance to the first point than an Euclidian distance between the first point and the second point; and
initiate generation of an output by the output device, the output including the second color in place of the first color.

13. The apparatus of claim 12, further comprising a display configured to present a graphical user interface (GUI) indicating the first color and the second color.

14. The apparatus of claim 12, wherein the output device comprises a printer device, and wherein the printer device is configured to print an article including the second color in place of the first color.

15. The apparatus of claim 12, wherein the processor is further configured to execute the instructions to generate the second indication based on a determination that the first color is external to the geometrical representation in the 3D color space.

16. The apparatus of claim 15, wherein the processor is further configured to determine that the first color is external to the geometrical representation in the 3D color space based on a plurality of coordinates associated with the first color and specified by the first indication.

17. A non-transitory computer-readable storage medium storing instructions executable by a processor to perform, initiate, or control operations comprising:
receiving information specifying a color gamut, wherein the color gamut corresponds to a range of colors producible by an output device;
receiving a first indication of a first color, the first color associated with a first point in a geometrical representation of the color gamut in a three-dimensional (3D) color space, wherein each point of the geometrical representation corresponds to a color of the color gamut;
based on the first color, generating a second indication of a second color that is included in the color gamut, the second color associated with a second point in the 3D color space, wherein the second point is identified based on a particular value of data associated with a plurality of color distances between the first point and a subset of points of the geometrical representation, wherein the color distances are determined using a color distance function, wherein the subset of points includes more than one and fewer than all points of the geometrical representation, and wherein a third point in the geometrical representation has a shorter Euclidian distance to the first point than an Euclidian distance between the first point and the second point; and
initiating generation of an output by the output device, the output including the second color in place of the first color.

18. The non-transitory computer-readable storage medium of claim 17, wherein the output device comprises a 3D printer device, and wherein generating the output comprises printing an article by the 3D printer device, the article including the second color in place of the first color.

19. The non-transitory computer-readable storage medium of claim 17, wherein the operations further comprise sending an instruction to the output device to cause the output device to print an article including the second color in place of the first color.

20. The non-transitory computer-readable storage medium of claim 17, wherein the second indication is generated based on a determination that the first color is external to the color gamut in the 3D color space.

21. A method comprising:
receiving information specifying a color gamut, wherein the color gamut corresponds to a range of colors producible by an output device;
receiving a first indication of a first color, the first color associated with a first point in a geometrical representation of the color gamut in a three-dimensional (3D) color space;
using a regression analysis technique, determining a spline function based on a plurality of color distances between the first point and a subset of points of the geometrical representation to generate data, wherein the subset of points includes more than one and fewer than all points of the geometrical representation, and wherein the color distances are determined using a color distance function;
identifying a critical point of the spline function to determine a particular value of the data;

based on the first color, generating a second indication of a second color that is included in the color gamut, the second color associated with a second point in the 3D color space, wherein the second point is identified based on the particular value of the data; and generating an output by the output device, the output including the second color in place of the first color.

\* \* \* \* \*